(12) United States Patent
Sakakibara et al.

(10) Patent No.: US 7,907,427 B2
(45) Date of Patent: Mar. 15, 2011

(54) INVERTER

(75) Inventors: Kenichi Sakakibara, Kusatsu (JP);
Hitoshi Haga, Sendai (JP)

(73) Assignee: Daikin Industries, Ltd., Osaka (JP)

( * ) Notice: Subject to any disclaimer, the term of this patent is extended or adjusted under 35 U.S.C. 154(b) by 208 days.

(21) Appl. No.: 12/374,931

(22) PCT Filed: Jun. 12, 2007

(86) PCT No.: PCT/JP2007/061785
§ 371 (c)(1),
(2), (4) Date: Jan. 23, 2009

(87) PCT Pub. No.: WO2008/013000
PCT Pub. Date: Jan. 31, 2008

(65) Prior Publication Data
US 2009/0237961 A1 Sep. 24, 2009

(30) Foreign Application Priority Data

Jul. 24, 2006 (JP) .................................. 2006-200584

(51) Int. Cl.
*H02M 5/45* (2006.01)
*H02M 5/458* (2006.01)
*H02M 1/12* (2006.01)
*H02M 1/14* (2006.01)

(52) U.S. Cl. .......................................... 363/37; 363/47
(58) Field of Classification Search .................. 363/37, 363/47, 48
See application file for complete search history.

(56) References Cited

U.S. PATENT DOCUMENTS 3,522,514 A 8/1970 Tornberg
4,545,002 A * 10/1985 Walker ........................... 363/37

(Continued)

FOREIGN PATENT DOCUMENTS

JP 59-61475 A 4/1984
JP 4-322168 A 11/1992
JP 9-172783 A 6/1997

OTHER PUBLICATIONS

"3. Direct AC power converter circuit (present condition and problems of a direct AC power converter circuit technology and related technologies)" of the 998th technical report of the Institute of Electrical Engineers of Japan, pp. 10-11 and 19, Feb. 2005.

(Continued)

*Primary Examiner* — Bao Q Vu
*Assistant Examiner* — Jue Zhang
(74) *Attorney, Agent, or Firm* — Birch, Stewart, Kolasch & Birch, LLP

(57) ABSTRACT

The inverter comprises a diode bridge (21) that rectifies an inputted three-phase AC voltage into a DC voltage, an inverter section (22) that converts the DC voltage converted by the diode bridge (21) into an AC voltage and outputs the resulting voltage, an LC filter that has an inductor $L_{dc}$ connected between one output terminal of the diode bridge (21) and one input terminal of the inverter section and a capacitor $C_{dc}$ connected across the input terminals of the inverter section, a voltage detecting section (24) that detects cross terminal voltage of the inductor $L_{dc}$, and a control section (100) that controls the inverter section (22). The control section (100) controls the inverter section (22) so that the transfer characteristic of the I/O voltage of the inverter section (22) becomes a characteristic of the first-order lag system on the basis of the cross terminal voltage of the inductor $L_{dc}$ detected by the voltage detecting section (24).

4 Claims, 19 Drawing Sheets

U.S. PATENT DOCUMENTS

| | | | |
|---|---|---|---|
| 5,245,522 A * | 9/1993 | Kawaguchi et al. | 363/37 |
| 5,621,628 A * | 4/1997 | Miyazaki et al. | 363/37 |
| 5,790,396 A | 8/1998 | Miyazaki et al. | |
| 6,794,929 B2 * | 9/2004 | Pelly | 363/37 |
| 7,190,143 B2 * | 3/2007 | Wei et al. | 363/47 |
| 7,388,353 B2 * | 6/2008 | Kato et al. | 363/37 |

OTHER PUBLICATIONS

Fraser et al., "Transformerless four-wire PWM rectifier and its application in AC-DC-AC converters", IEE Proc. Electr. Power Appl., vol. 142. No. 6, Nov. 1995, pp. 410-416.

* cited by examiner

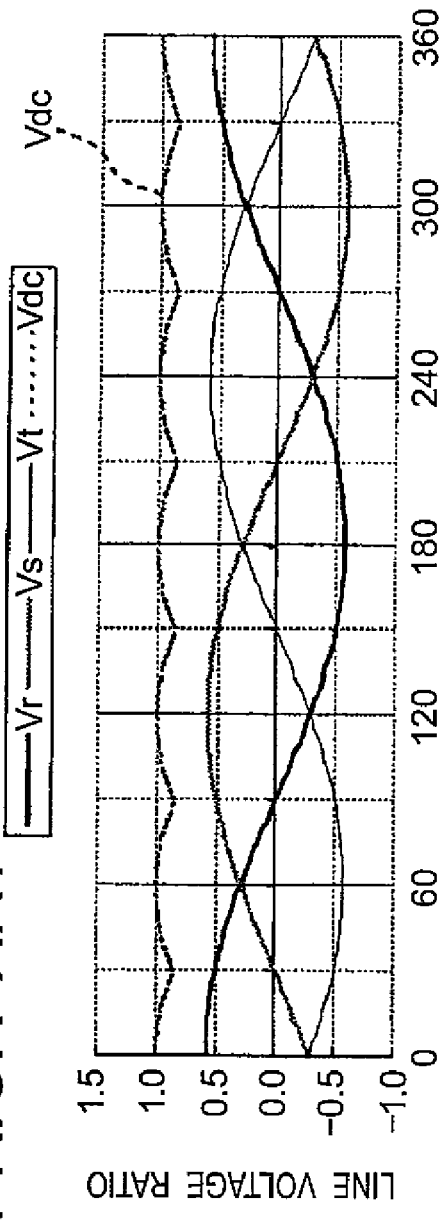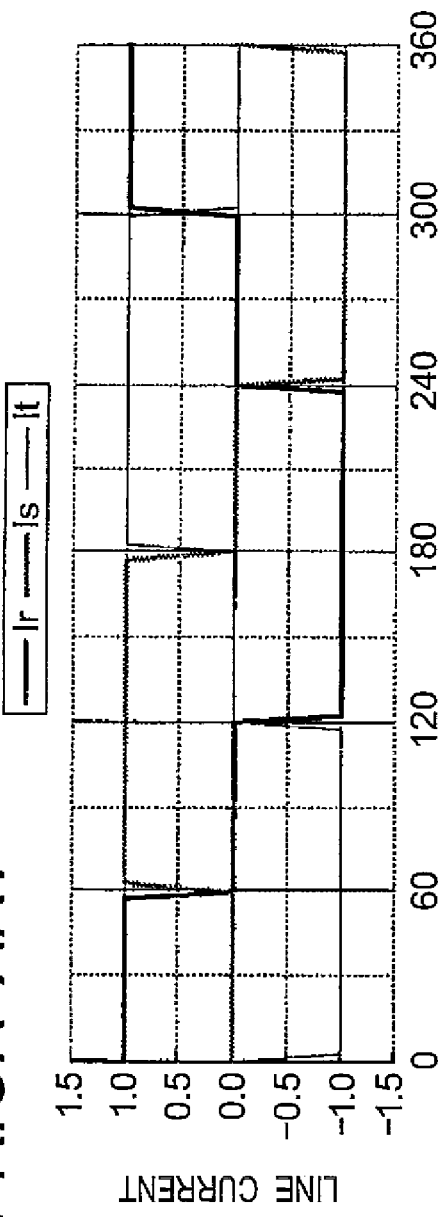
Fig.2A PRIOR ART
Fig.2B PRIOR ART

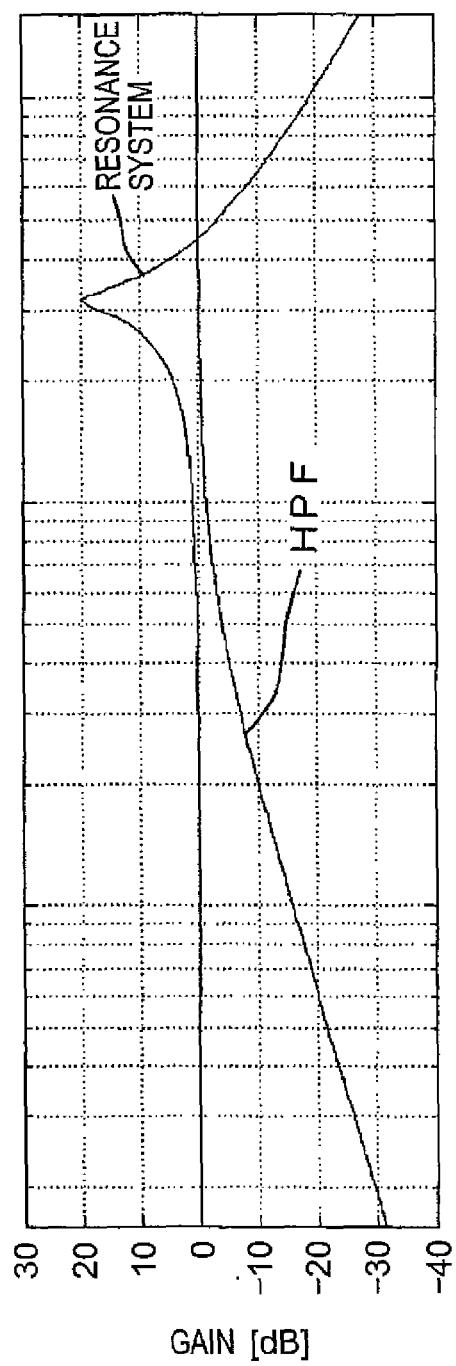
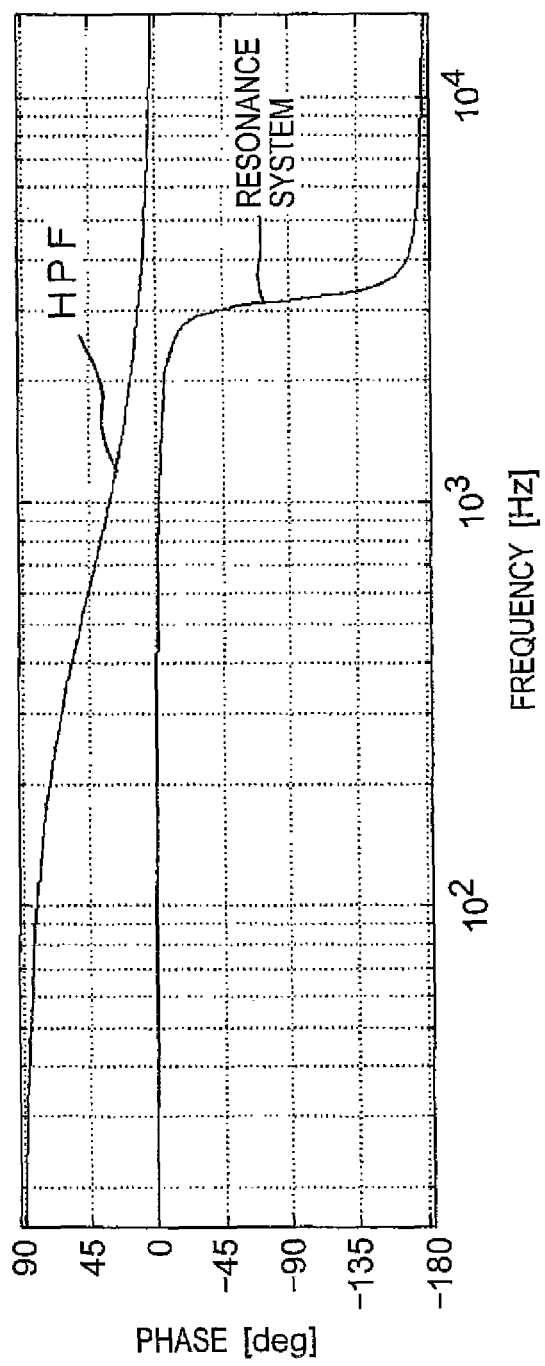
Fig.8A PRIOR ART
Fig.8B PRIOR ART

Fig.11

$$G(s) = \frac{V_o}{V_s} = \frac{\dfrac{kLs+1}{Ls}}{1+\dfrac{kLs+1}{Ls}\dfrac{1}{Cs}}\dfrac{1}{Cs} = \frac{kLs+1}{LCs^2+kLs+1}$$

$$= \frac{ks/C+1/LC}{s^2+ks/C+1/LC} = (kLs+1)\frac{1/LC}{s^2+ks/C+1/LC}$$

$$f_1 = \frac{1}{2\pi kL}$$

$$f_2 = \frac{1}{2\pi\sqrt{LC}}, \zeta = \frac{k}{2}\sqrt{\frac{L}{C}}$$

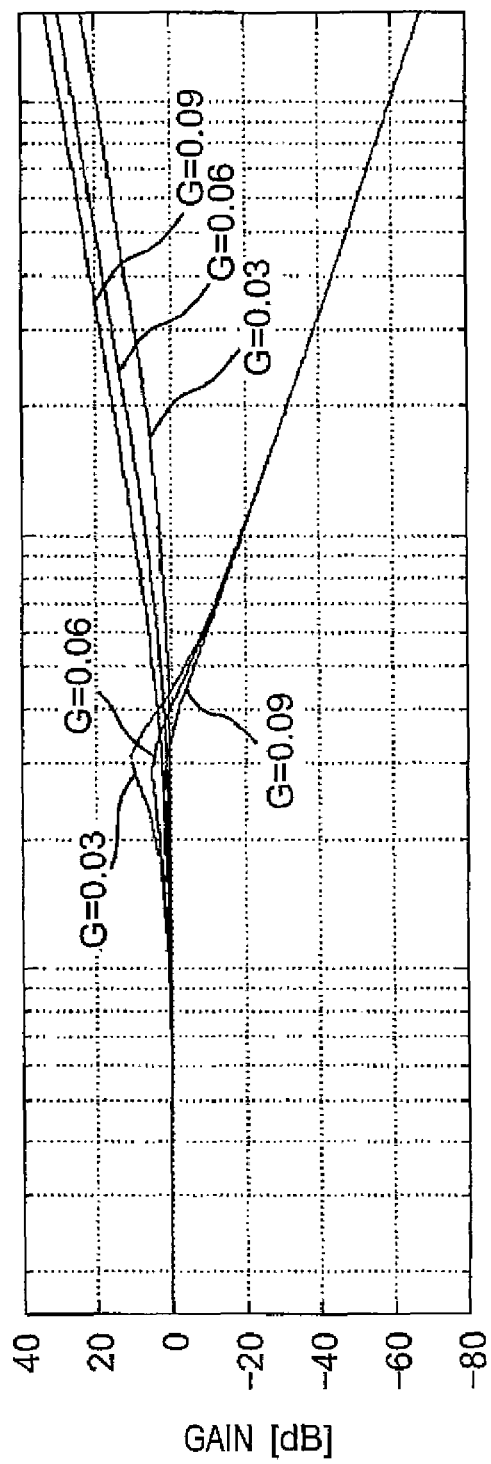
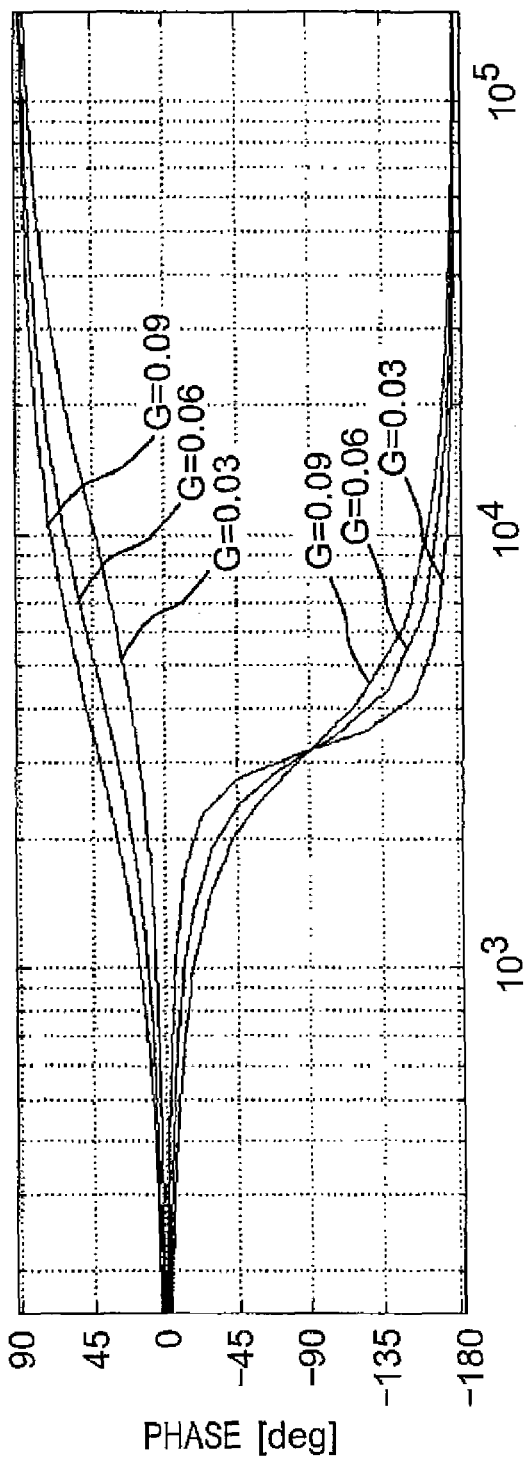
Fig. 13A
Fig. 13B

INVERTER

TECHNICAL FIELD

The present invention relates to inverters, and in particular, to an inverter that has an LC filter for suppressing only a carrier current component in a DC link part between a diode bridge and an inverter section.

BACKGROUND ART

Conventionally, as a typical inverter main circuit construction, a construction for once converting a commercial alternating current into a DC voltage via a rectifying circuit and a smoothing circuit and obtaining an AC voltage by a voltage-fed inverter section is generally employed. In this case, the smoothing circuit needs large-scale capacitor and reactor for smoothing voltage pulsations at the commercial frequency, and this therefore causes an increase in volume and a cost increase of the inverter section. Therefore, a main circuit construction for compacting the LC filter and suppressing only the carrier current component of the inverter is proposed. (Refer to, for example, "3. Direct AC power converter circuit (present condition and problems of a direct AC power converter circuit technology and related technologies)" of the 998th technical report of The Institute of Electrical Engineers of Japan (Reference Document 1)).

On the other hand, it is known that the DC voltage sometimes pulsates at the resonance frequency of the LC filter due to load fluctuations and output frequency fluctuations in the inverter that has the LC filter in the DC link part, and an inverter that detects the vibration components of a DC voltage by an HPF (high-pass filter) and suppresses the vibrations in a current control system on the inverter side is proposed. (Refer to, for example, JP H09-172783 A (Reference Document 2)).

The inverter that has the compacted LC filter in the DC link part is preconditioned so that the DC voltage is made to pulsate at a sixfold frequency of the power frequency, and the higher harmonic frequency of the power pulsation component and the resonance frequency of the filter become close to each other by the vibration suppression method described above. Accordingly, it is difficult to separate both of them from each other, and there is a problem that low-order distortions occur in the input current as a consequence of the smoothing of the DC voltage.

DISCLOSURE OF THE INVENTION

It is an object of the present invention to provide an inverter capable of suppressing the distortions of the input current with vibrations suppressed in the inverter that has the LC filter in the DC link part.

In order to achieve the above object, there is provided an inverter comprising:

a diode bridge that rectifies an inputted three-phase AC voltage into a DC voltage;

an inverter section that converts the DC voltage converted by the diode bridge into an AC voltage and outputs the resulting voltage;

an LC filter having an inductance element connected between one output terminal of the diode bridge and one input terminal of the inverter section and a capacitance element connected across input terminals of the inverter section;

a voltage detecting section that detects a cross terminal voltage of the inductance element of the LC filter; and a control section that controls the inverter section so that a transfer characteristic of an I/O voltage of the inverter section becomes a characteristic close to a first-order lag system on the basis of the cross terminal voltage of the inductance element detected by the voltage detecting section.

According to the above construction of the inverter having the LC filter in the DC link part, the control section controls the inverter section so that the transfer characteristic of the I/O voltage of the inverter section become a characteristic close to the first-order lag system. Thus, the inverter can suppress vibrations as well as distortions of the input current. Moreover, the vibrations are suppressed on the basis of the cross terminal voltage of the inductance element. Therefore, the output current set point of the diode bridge becomes a direct current, and the control becomes possible without interference with the resonance frequency of the LC filter.

In one embodiment of the invention, the control section controls an input current of the inverter section so that the transfer characteristic of the I/O voltage of the inverter section becomes a characteristic close to the first-order lag system on the basis of the cross terminal voltage of the inductance element detected by the voltage detecting section.

According to the above embodiment, the attenuation coefficient is increased by controlling the input current of the inverter section by the control section on the basis of the cross terminal voltage of the inductance element detected by the voltage detecting section, and stability is improved by making the control system have a characteristic close to the first-order lag system by gain setting corresponding to the constant of the reactance element of the LC filter.

In one embodiment of the invention, the control section controls a voltage control ratio of the inverter section so that the transfer characteristic of the I/O voltage of the inverter section becomes a characteristic close to the first-order lag system on the basis of the cross terminal voltage of the inductance element detected by the voltage detecting section.

According to the above embodiment, the attenuation coefficient is increased by controlling the voltage control ratio of the inverter section by the control section on the basis of the cross terminal voltage of the inductance element detected by the voltage detecting section, and stability is improved by making the control system have a characteristic close to the first-order lag system by gain setting corresponding to the constant of the reactance element of the LC filter. Moreover, since the relation between the AC load current and the DC load current can be directly controlled by the voltage control ratio, a high-speed response can be achieved, and more stable operation becomes possible.

In one embodiment of the invention, the inverter section is vector-controlled by the control section.

According to the above embodiment, the inverter section is vector-controlled by the control section, and therefore, speed control can easily be performed with stable operation.

As is apparent from the above, according to the inverter of the invention, in the inverter having the LC filter in the DC link part, the distortions of the input current can be suppressed with vibrations suppressed, and the vibration suppression is performed on the basis of the cross terminal voltage of the inductance element. Therefore, the output current set point of the diode bridge becomes a direct current, and control becomes possible without interference with the resonance frequency of the LC filter.

Moreover, according to the inverter of one embodiment, the attenuation coefficient is increased by controlling the input current of the inverter section by the control section on the basis of the cross terminal voltage of the inductance element detected by the voltage detecting section, and stability is improved by making the control system have a characteristic close to the first-order lag system by gain setting corresponding to the constant of the reactance element of the LC filter.

Moreover, according to the inverter of one embodiment, the attenuation coefficient is increased by controlling the voltage control ratio of the inverter section by the control section on the basis of the cross terminal voltage of the inductance element detected by the voltage detecting section, and stability is improved by making the control system have a characteristic close to the first-order lag system by gain setting corresponding to the constant of the reactance element of the LC filter. In addition, the relation between the AC load current and the DC load current can be directly controlled by the voltage control ratio, a high-speed response can be achieved, and more stable operation becomes possible.

Moreover, according to the inverter of one embodiment, the inverter section is vector-controlled by the control section, and therefore, speed control can easily be performed with stable operation.

BRIEF DESCRIPTION OF THE DRAWINGS

FIG. 2A is a graph showing the DC voltage of the inverter;
FIG. 2B is a graph showing the line currents of the inverter;
FIG. 8 is a diagram showing a resonance system and an HPF characteristic;
FIG. 11 is an expression showing the transfer function of the inverter;
FIG. 13 is a Bode diagram showing the transfer characteristic of the second-order phase lead system of the inverter.

DETAILED DESCRIPTION OF THE INVENTION

Figure 1:
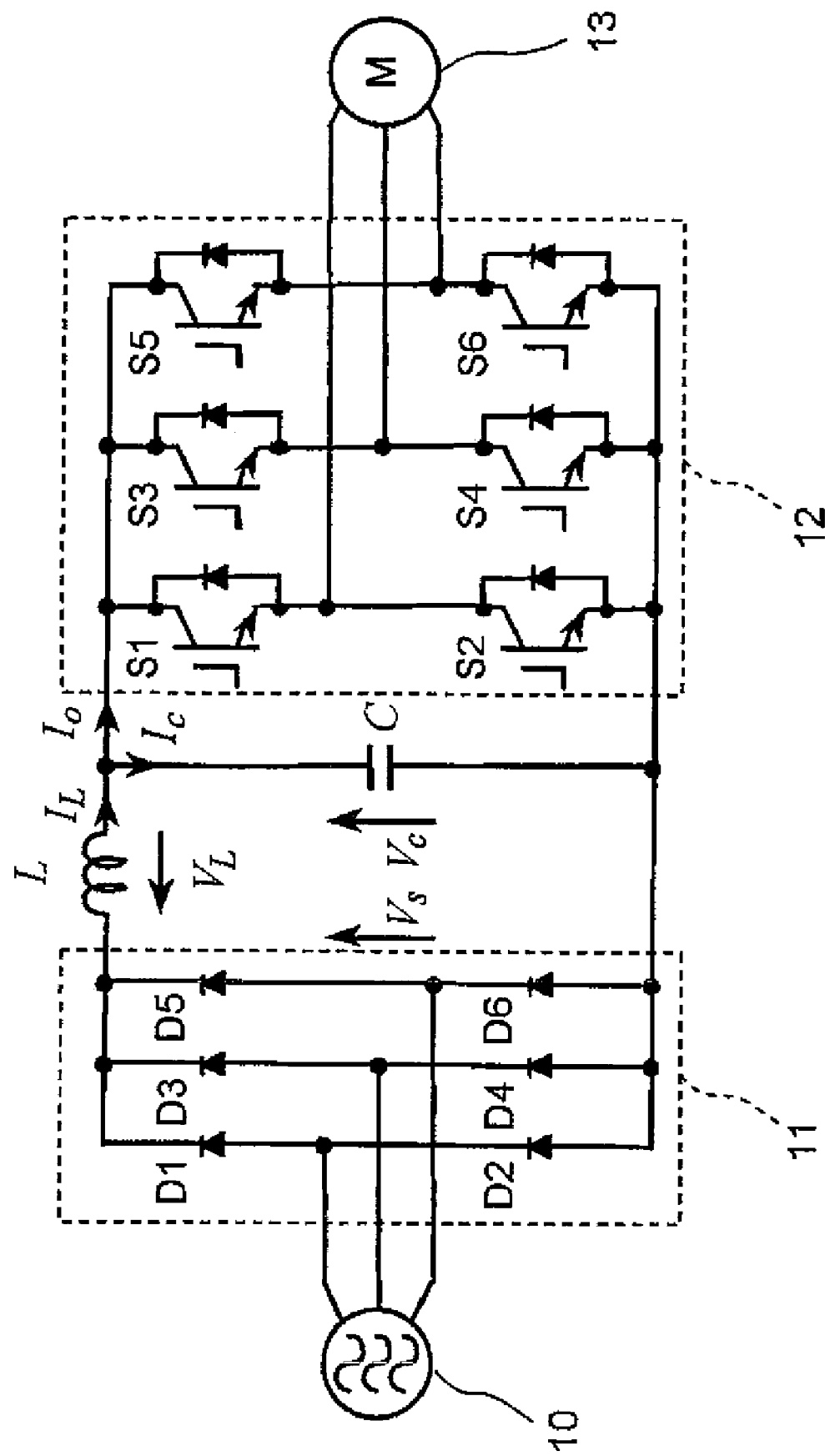
FIG. 1 is a block diagram of a conventional inverter.

Before the inverter of the invention is described in detail by the embodiments shown in the drawings, the principle of operation of the inverter of the invention is described.

FIG. 1 shows the main circuit construction of the inverter that has the LC filter in the DC link part described in Reference Document 1 (("3. direct AC power converter circuit (present condition and problems of a direct AC power converter circuit technology and related technologies)", 998th technical report of The Institute of Electrical Engineers of Japan, Feb. 25, 2005). As shown in FIG. 1, the inverter has a diode bridge 11 constructed of six diodes D1 through D6 that constitute a three-phase bridge circuit, and an inverter section 12 constructed of six switching elements S1 through S6 that constitute a three-phase bridge circuit. Moreover, the inverter has an inductor L as one example of the inductance element connected between the positive pole side output terminal of the diode bridge 11 and the positive pole side input terminal of the inverter section 12, and a capacitor C as one example of the capacitance element connected across the input terminals of the inverter section 12. The inductor L and the capacitor C constitute an LC filter. A three-phase AC voltage from a three-phase AC power source 10 is rectified into a direct current by the diode bridge 11, and the rectified DC voltage is converted into a prescribed three-phase AC voltage by the inverter section 12 and outputted to a motor 13.

The components of the inverter shown in FIG. 1 are similar to those of an ordinary voltage-fed inverter with a DC reactor. It is noted that the capacitor C of the LC filter in the DC link part has a small capacitance of not greater than 1/100 that of the conventional one, the resonance frequency of the LC filter is set to about several kilohertz being one order higher than that of the conventional one in order to attenuate the carrier current component of the inverter and the inductance of the reactor L is set to a small value. For example, the capacitance of the capacitor of the LC filter in the DC link part of the ordinary voltage-fed inverter with the DC reactor is set to 2000 µF, the inductance of the reactor is set to 1 mH, and the resonance frequency is set to about 113 Hz. In contrast to this, the capacitance of the capacitor C of the LC filter in the DC link part of the inverter shown in FIG. 1 is 4.4 µF, the inductance of the reactor L is 0.5 mH, and the resonance frequency is 3.4 kHz.

Therefore, the reactor L and the capacitor C in the DC link part do not have the effect of smoothing the commercial frequency component. As shown in the waveform of the DC voltage (Vdc) of FIG. 2A, a voltage corresponding to difference between a maximum phase and a minimum phase of the phase voltages appears in the DC link part and the voltage eventually pulsates at the sixfold frequency of the commercial frequency. Moreover, regarding the input current, a DC current flows also between the lines of the maximum phase and the minimum phase and therefore, 120° conduction waveforms result as shown in the waveforms of FIG. 2B when the input current of the inverter section is constant.

Here, in the above inverter, the transfer characteristic of the output voltage with respect to the pulsating voltage of the LC filter can be expressed by the secondary system of the following generally well-known equations.

Figure 3:
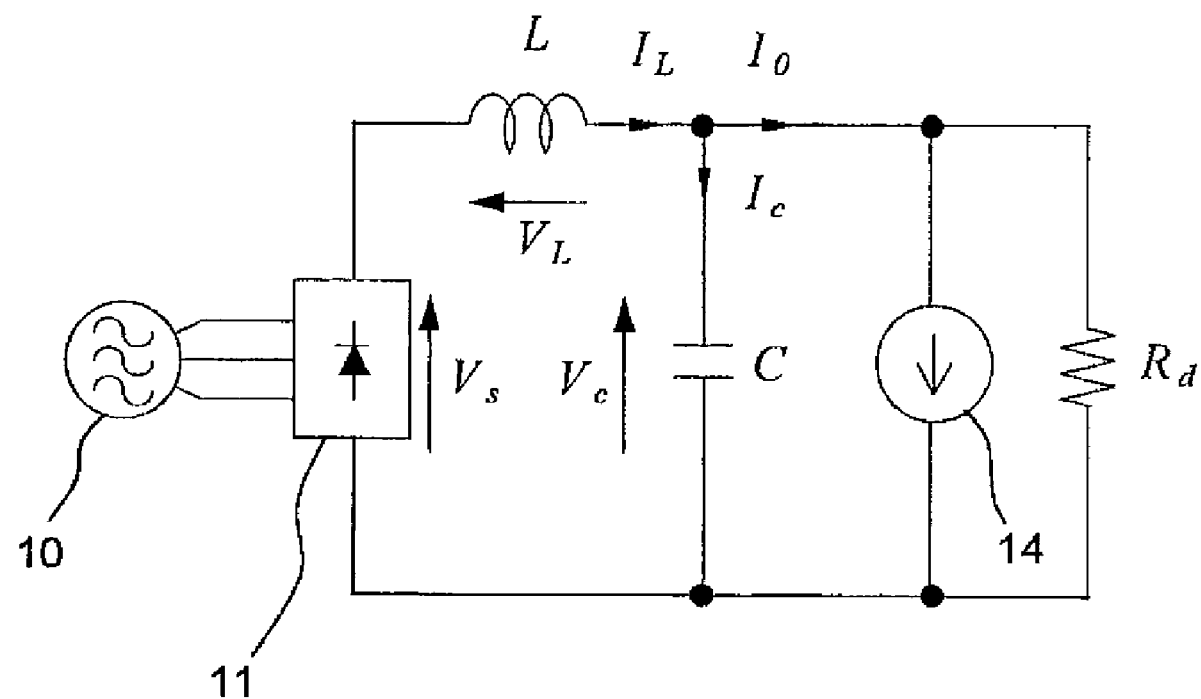
FIG. 3 is a diagram for explaining the transfer characteristic when a damping resistor is inserted in the inverter.

FIG. 3 shows a diagram in which a damping resistor Rd is inserted on the inverter section side in the equivalent circuit of the inverter of FIG. 1. In FIG. 3, reference numeral 14 denotes a current source that simply expresses the inverter section.

As shown in FIG. 3, with the damping resistor Rd inserted, the transfer function G(s) of the inverter is expressed as follows, and the attenuation characteristic ξ of the LC filter can be improved by setting the damping resistor Rd.

$$G(s) = \frac{V_o}{V_s}$$

$$= \frac{\frac{1}{LC}}{s^2 + \frac{s}{CR_d} + \frac{1}{LC}}$$

$$f = \frac{1}{2\pi\sqrt{LC}}$$

$$\zeta = \frac{1}{2R_d}\sqrt{\frac{L}{C}}$$

In the equations, $V_s$ is the DC voltage outputted from the diode bridge, $V_o$ is the output voltage of the inverter section, L is inductance, C is capacitance, and s is Laplace variable.

In the Reference Document 2 (JP H09-172783 A), it is assumed that the damping resistor is equivalently inserted as in the following equation by detecting the output voltage of the inverter section and changing a load current $i_o$ by means of the current control system.

$$i_o = \frac{1}{R_d}V_o$$

$$= GV_o$$

Moreover, since the output voltage $V_s$ of the diode bridge is a direct current in this case, resonance is suppressed by inserting an HPF (high-pass filter) in a feedback path and detecting only a voltage attributed to resonance.

Figure 4:
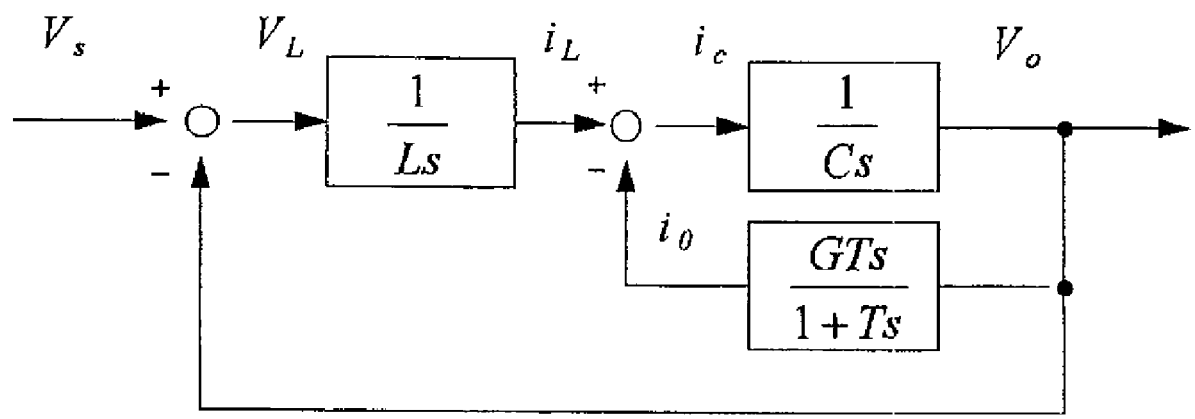
FIG. 4 is a block diagram of the inverter.

FIG. 4 shows a block diagram of the inverter of Reference Document 2 (JP H09-172783 A) explained in the background art.

Next, the results of applying the conventional system to the inverter are described with reference to FIGS. 5A through 5D and FIGS. 6A through 6D. FIGS. 5A through 5D and FIGS. 6A through 6D show the results of transient analyses when the cutoff frequency of HPF is set to 600 Hz and a gain G is changed to 0, 0.2, 0.4 and 0.6. Moreover, the inverter section is simply assumed to be a current source, and a voltage resonance component is added to a current instruction via the HPF and the gain G shown in FIG. 4.

In the above inverter, the DC voltage needs to have a pulsating form of the sixfold frequency of the commercial frequency. However, since the pulsation component is a distorted wave containing higher harmonics as shown in the waveforms of FIGS. 6A through 6D, it is difficult to separate the higher harmonic component from the resonance component by the LC filter when resonance suppression control is performed by DC voltage detection, and distortions occur in the current waveform.

Figure 5A:
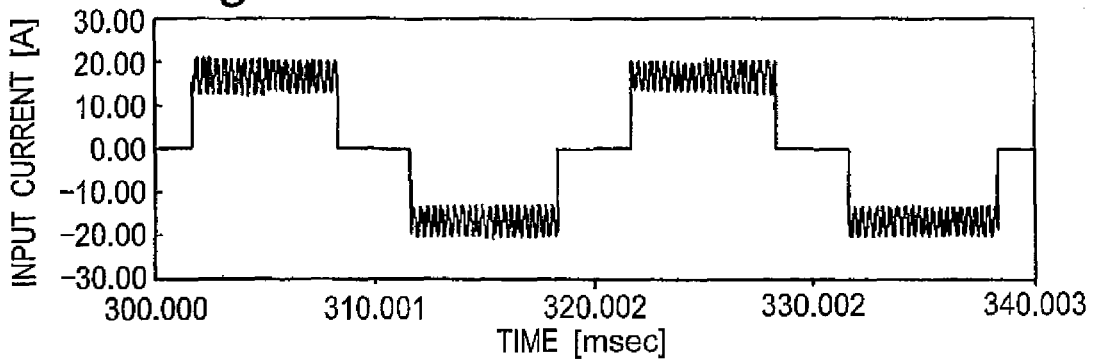
FIG. 5A is a graph showing the transient analysis result of the input current of the inverter.
Figure 5B:
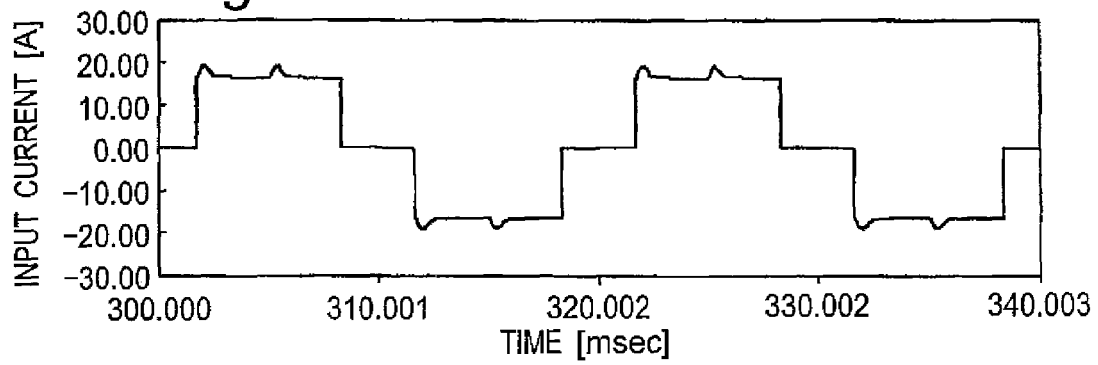
FIG. 5B is a graph showing the transient analysis result of the input current of the inverter.
Figure 5C:
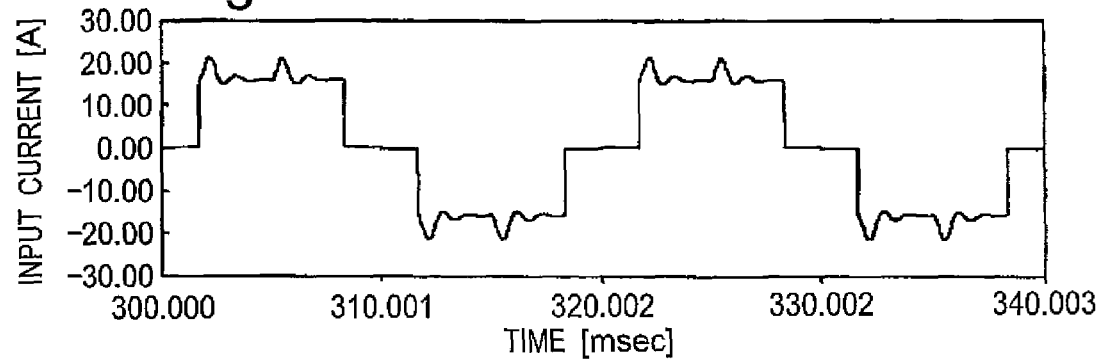
FIG. 5C is a graph showing the transient analysis result of the input current of the inverter.
Figure 5D:
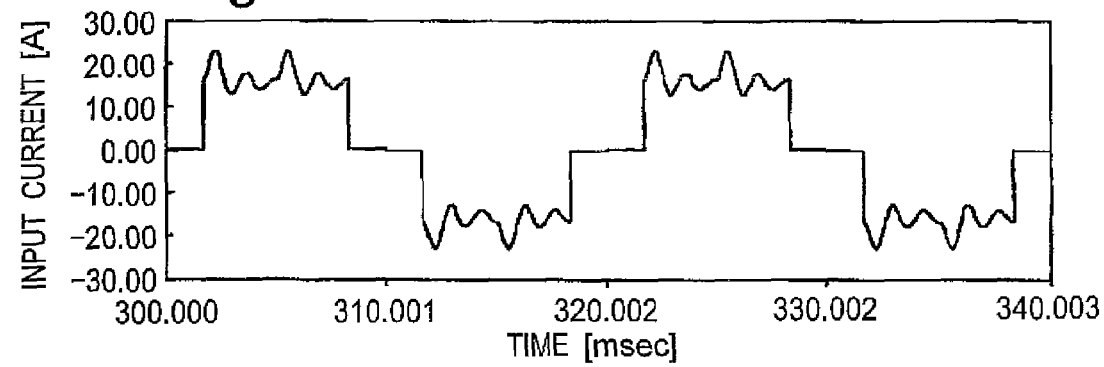
FIG. 5D is a graph showing the transient analysis result of the input current of the inverter.
Figure 6A:
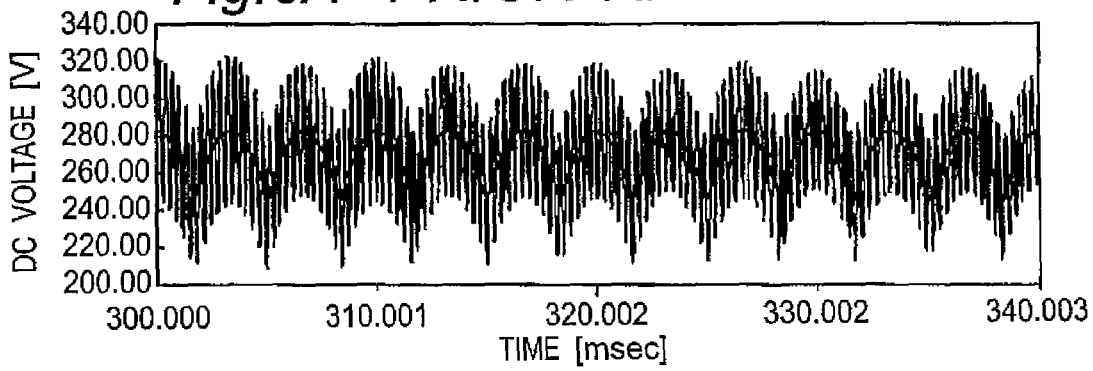
FIG. 6A is a graph showing the transient analysis result of the DC voltage of the inverter.
Figure 6B:
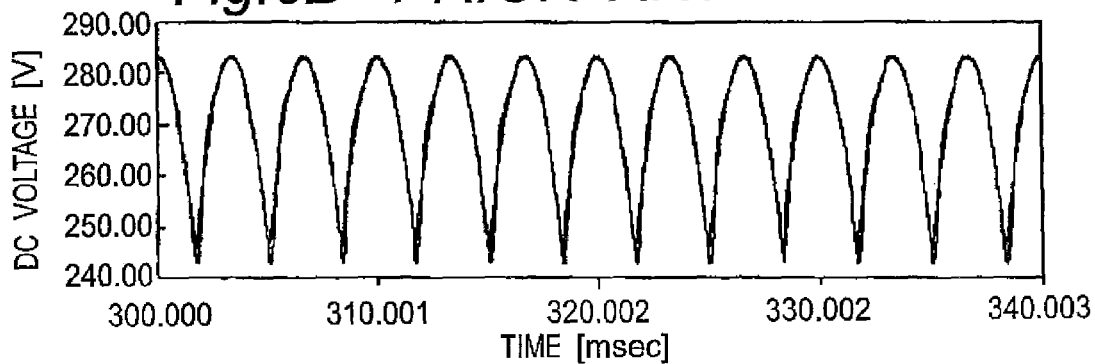
FIG. 6B is a graph showing the transient analysis result of the DC voltage of the inverter.
Figure 6C:
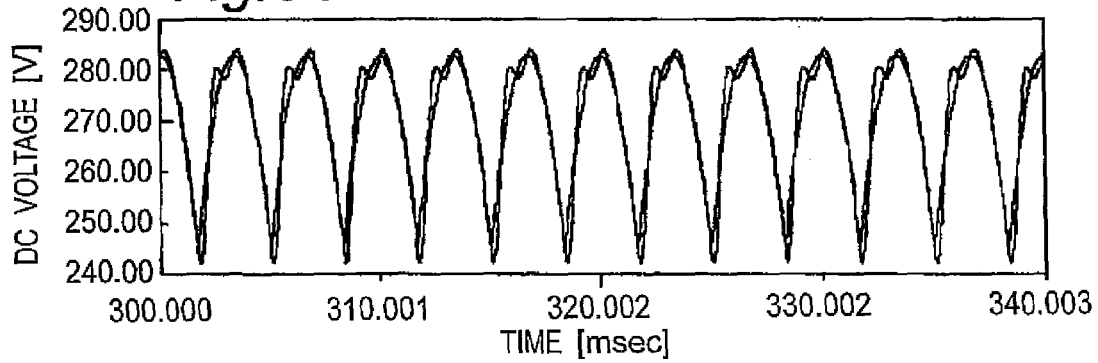
FIG. 6C is a graph showing the transient analysis result of the DC voltage of the inverter.
Figure 6D:
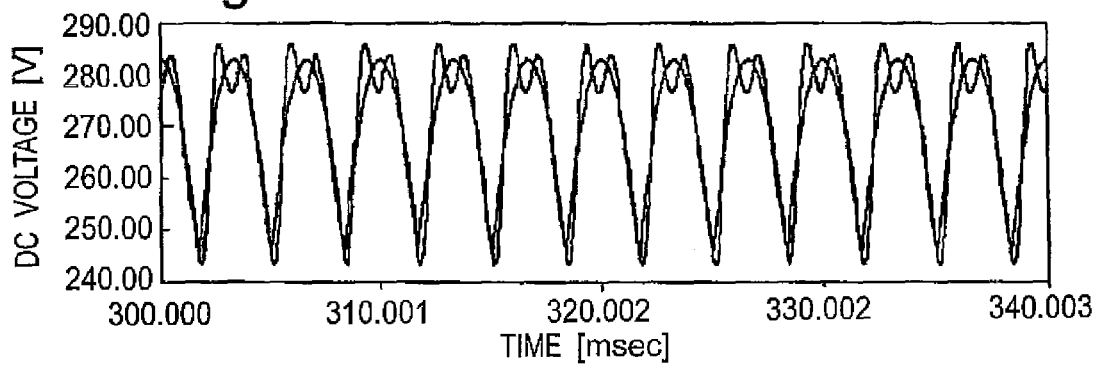
FIG. 6D is a graph showing the transient analysis result of the DC voltage of the inverter.
Figure 7A:
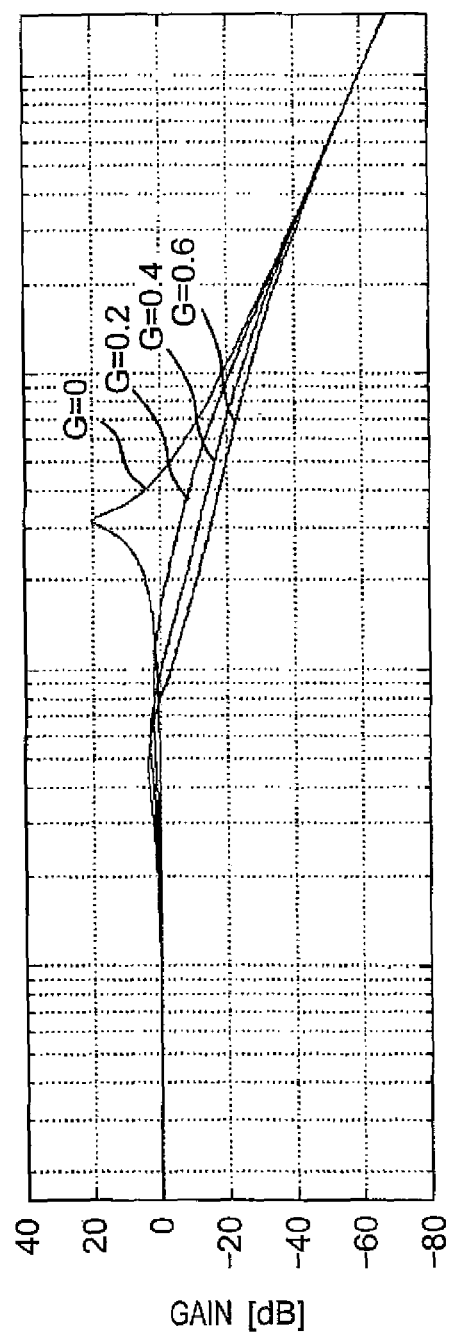
FIG. 7 is a Bode diagram of the inverter.
Figure 7B:
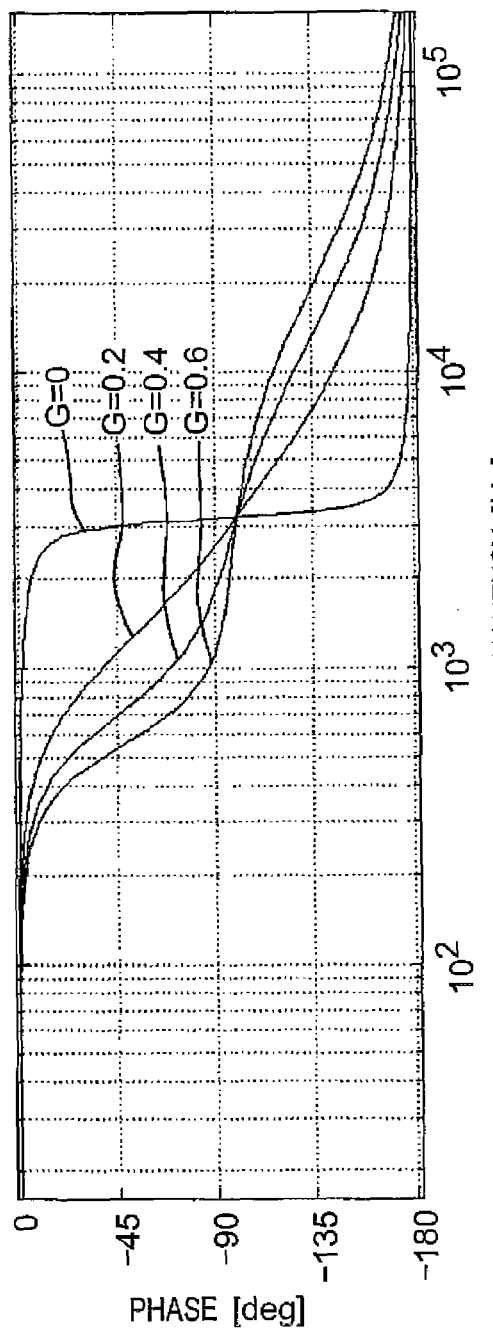

As shown in FIG. 5B, although the resonance current is suppressed when the gain is 0.2, distortions occur in the pulsating voltage by the compensation for the voltage waveform as shown in FIGS. 6A through 6D, and therefore, vibrations consequently occur in the waveform at the timing of phase change. Further, when control is attempted with an increased gain, a pole occurs in the vicinity of the cutoff frequency of HPF (refer to FIG. 8 for the characteristics of HPF and the resonance system) as shown in the Bode diagram of FIG. 7, conversely degrading the waveform as a result.

As described above, it is difficult to apply the vibration suppression by the DC voltage detection to the inverter that needs a pulsating voltage.

The above results show the fact that a distortion current flows through the reactor L due to a voltage difference between the DC voltage and the line voltage waveform, and the current that flows through the reactor L becomes a direct current in the absence of resonance. Therefore, the resonance was suppressed by detecting the voltage applied to the reactor L in the invention.

Figure 9:
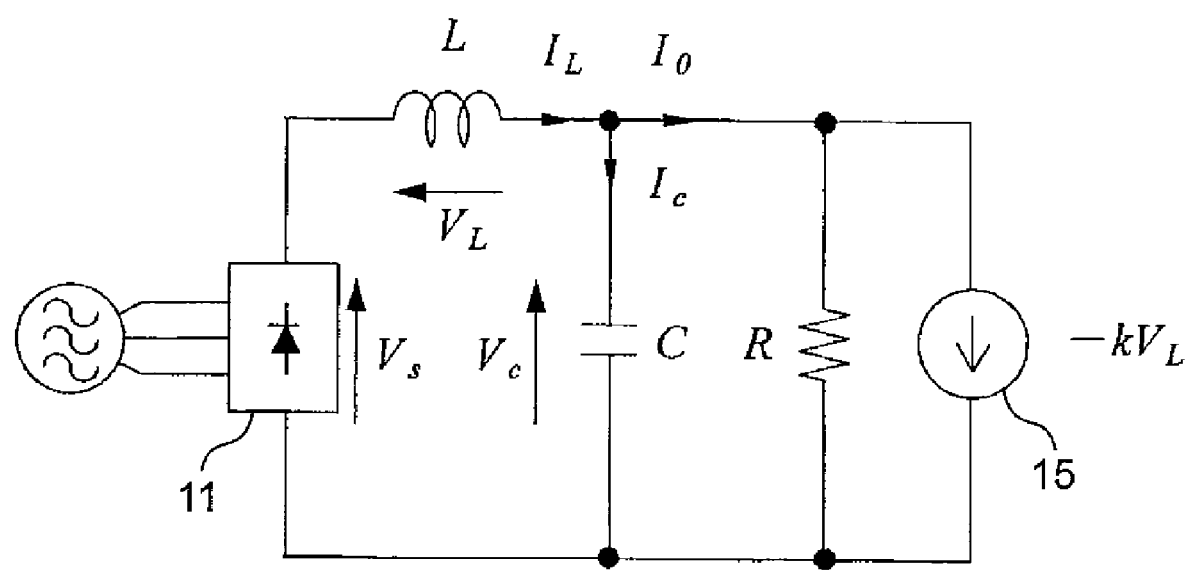
FIG. 9 is a diagram for explaining the transfer characteristic when vibration suppression control is performed in the inverter of the invention.

FIG. 9 shows a diagram for explaining the transfer characteristic of the inverter that employs the cross terminal voltage $V_L$ of the reactor L of the invention for resonance control, and reference numeral 15 denotes a current source that simply expresses the inverter section in FIG. 9.

FIGS. 10A through 10D are block diagrams in which the characteristic of the resonance system is obtained when the cross terminal voltage of the reactor L is used for the resonance control. If the control system is subjected to equivalent transformation in the order of FIG. 10A to FIG. 10D, it can be discovered that a series system constituted of the secondary system shown in FIG. 10D and the phase lead finally result.

FIG. 11 expresses the block diagrams of FIGS. 10A through 10D by the transfer function, in which the attenuation characteristic can be improved by the gain k since the second term represents the secondary system, and the first term represents the phase lead. Therefore, a characteristic close to a stable first-order lag system can be achieved by both of them. The transfer function shown in FIG. 11 substantially has a characteristic of the first-order lag system.

FIG. 13 is a Bode diagram showing the transfer characteristics of the secondary system and the phase lead when the gain is set to 0.03 to 0.09, and it can be understood that the pole and the cutoff frequency almost exhibit coincidence.

Figure 12A:
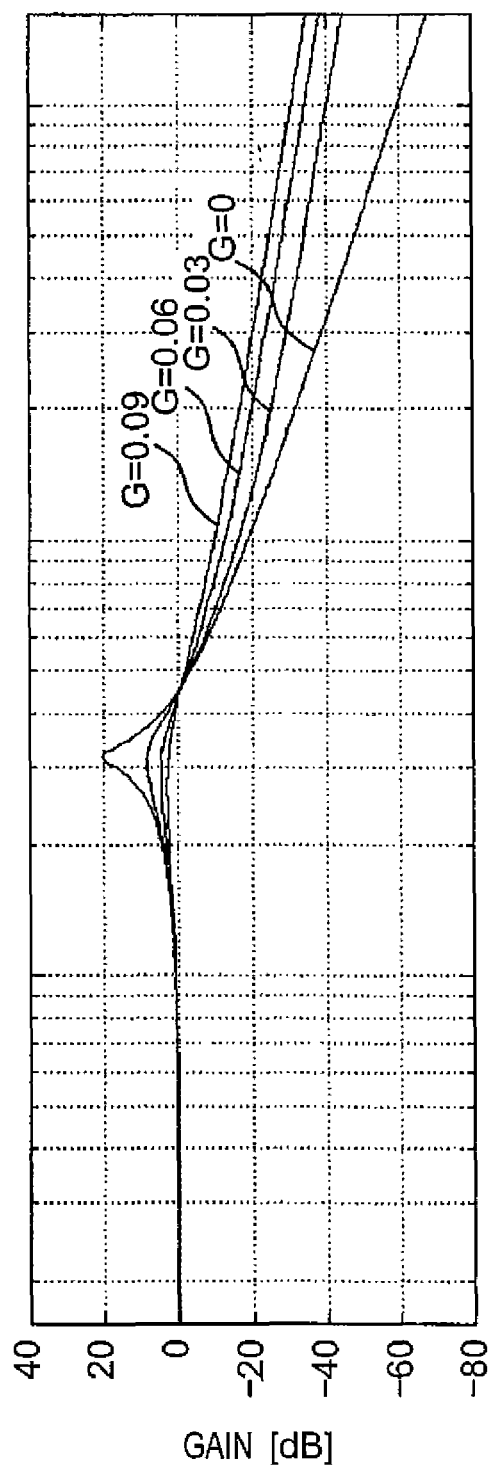
FIG. 12 is a Bode diagram showing the transfer characteristic of the vibration suppression system of the inverter.
Figure 12B:
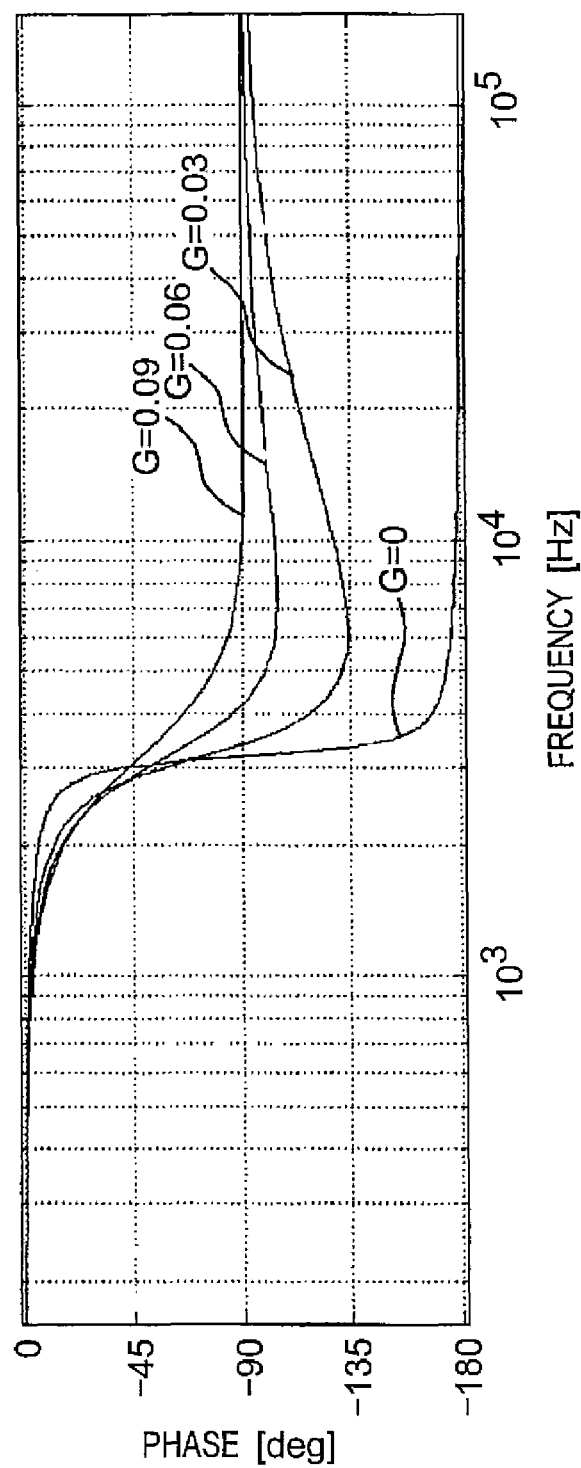
Figure 14A:
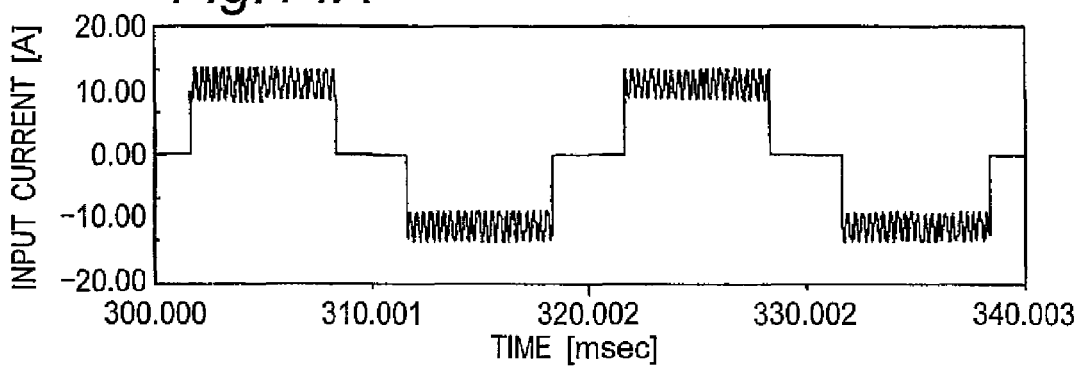
FIG. 14A is a graph showing the transient analysis result of the input current of the inverter.
Figure 14B:
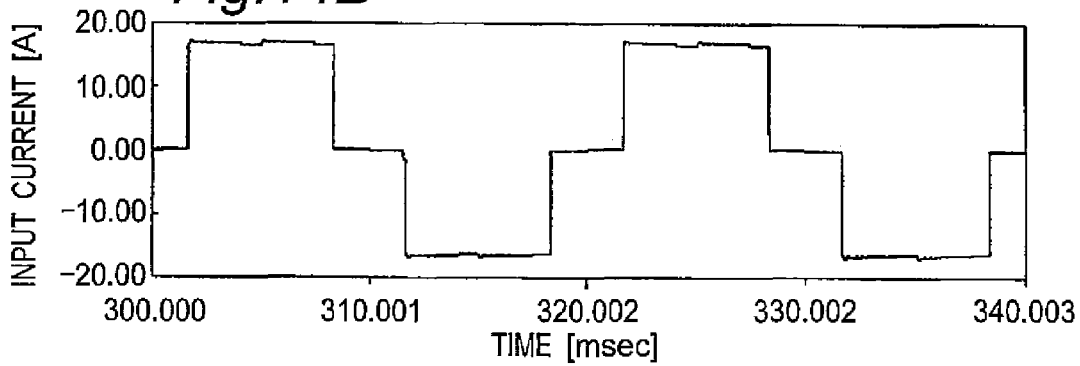
FIG. 14B is a graph showing the transient analysis result of the input current of the inverter.
Figure 14C:
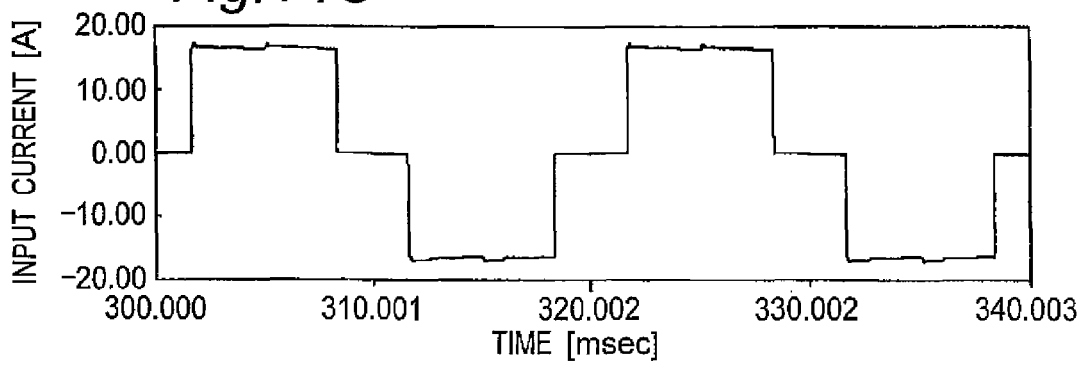
FIG. 14C is a graph showing the transient analysis result of the input current of the inverter.
Figure 14D:
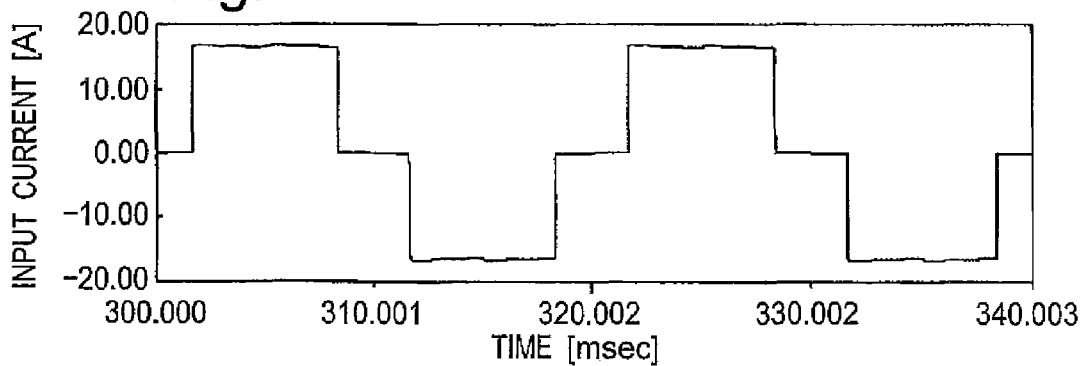
FIG. 14D is a graph showing the transient analysis result of the input current of the inverter.
Figure 15A:
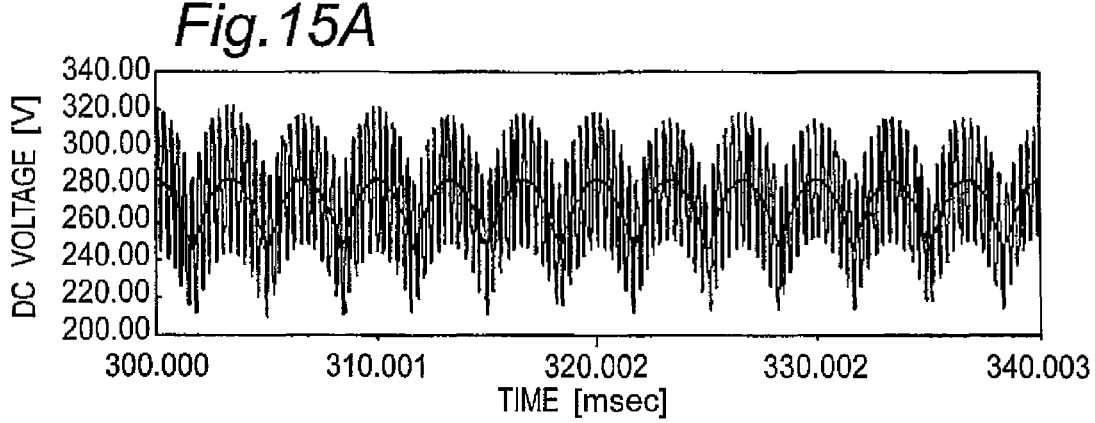
FIG. 15A is a graph showing the transient analysis result of the DC voltage of the inverter.
Figure 15B:
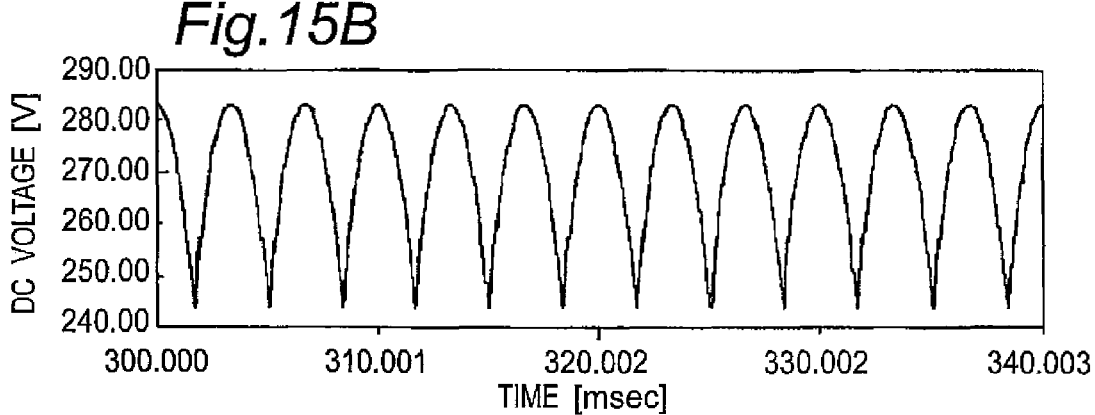
FIG. 15B is a graph showing the transient analysis result of the DC voltage of the inverter.
Figure 15C:
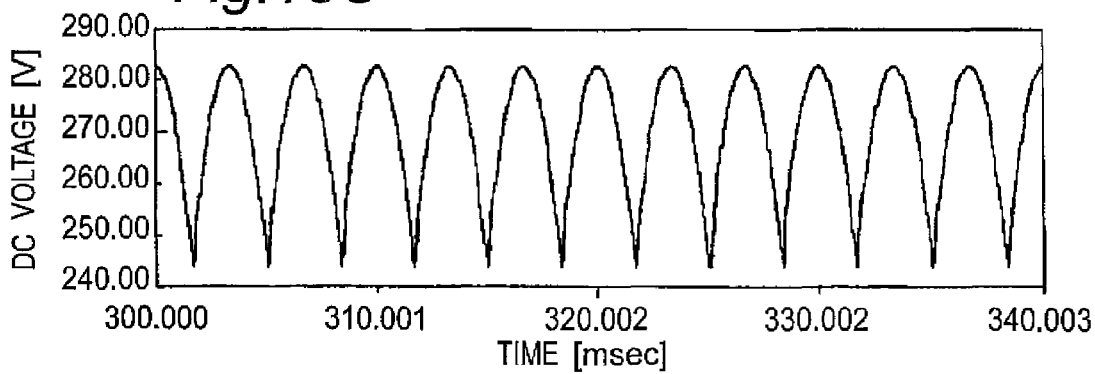
FIG. 15C is a graph showing the transient analysis result of the DC voltage of the inverter.
Figure 15D:
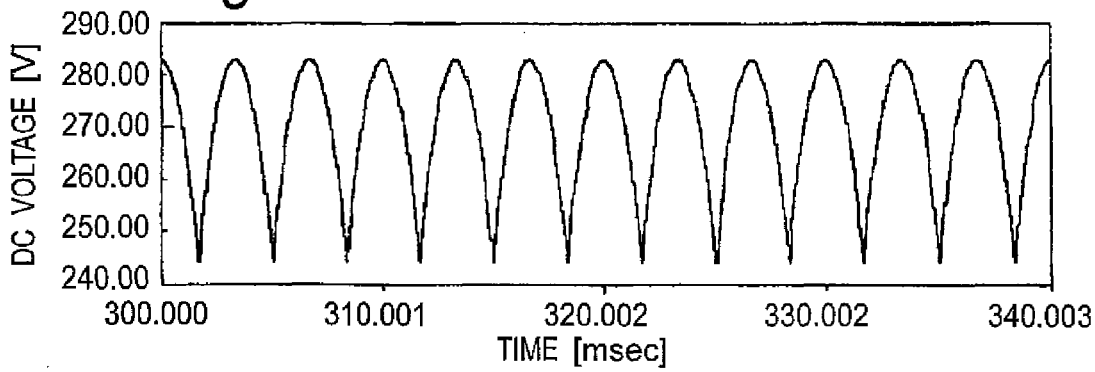
FIG. 15D is a graph showing the transient analysis result of the DC voltage of the inverter.

FIG. 12 is a Bode diagram showing the transfer characteristic of the vibration suppression system. The attenuation characteristic is improved when the gain is low, and a stable characteristic close to the first-order lag system can be achieved when the gain is further increased.

FIGS. 14A through 14D and FIGS. 15A through 15D show transient analysis results when the gain G is changed to 0, 0.03, 0.06 and 0.09. FIGS. 14A through 14D and FIGS. 15A through 15D show the transient analysis results of the inverter in which the cross terminal voltage $V_L$ of the reactor L is used for the resonance suppression. As shown in FIGS. 14A through 14D and FIGS. 15A through 15D, slight distortions are observed both in the input current and the DC voltage when the gain is low. However, if the gain is increased so that a characteristic close to the first-order lag is obtained, a 120° conduction waveform tree of resonance is obtained as the input current, and the DC voltage coincides with the pulsation component attributed to the line voltage regarding voltage.

Figure 18:
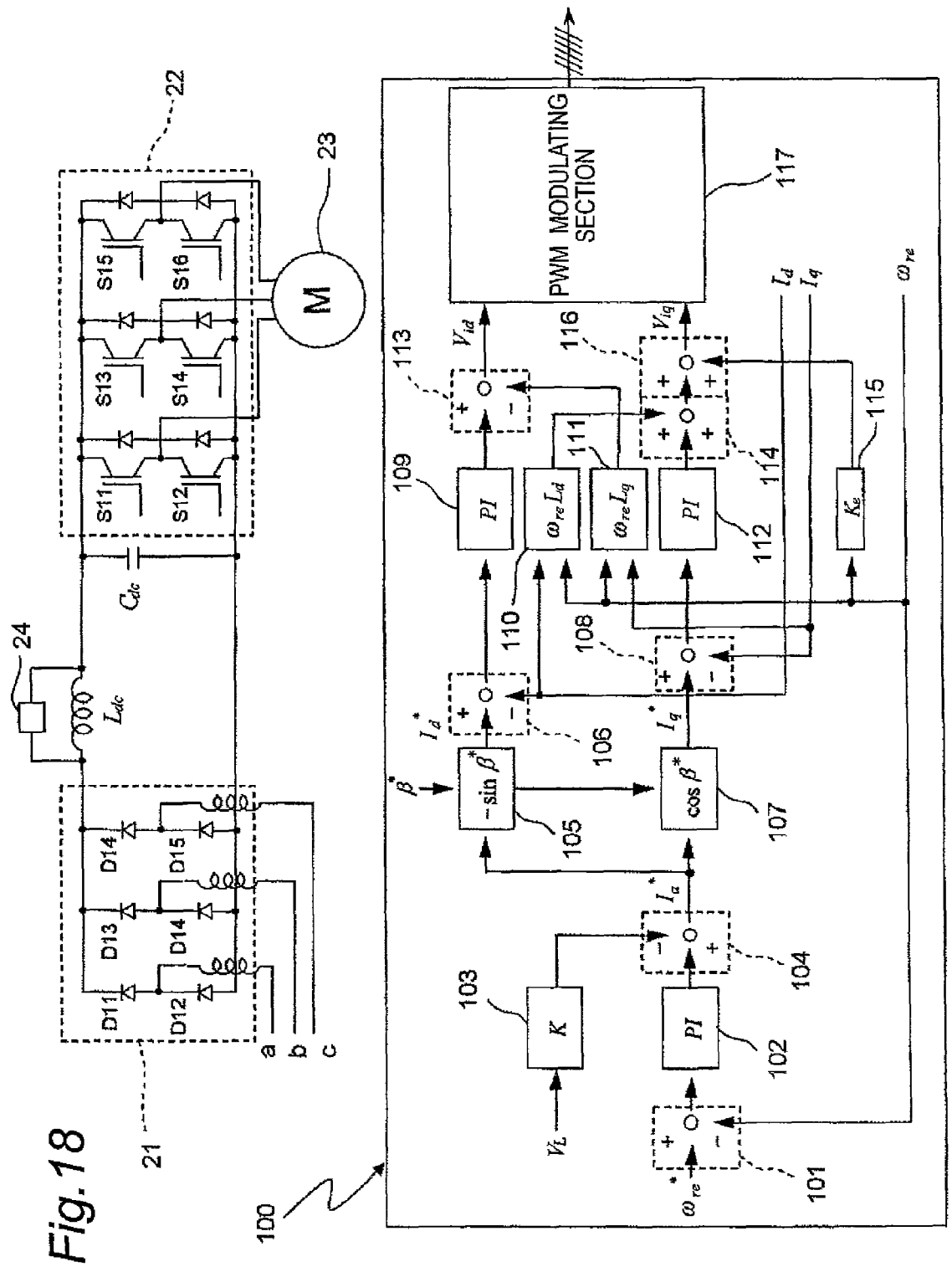
FIG. 18 is a block diagram of the inverter of the first embodiment of the invention.

According to the transient analysis results of FIGS. 14A through 14D and FIGS. 15A through 15D, the inverter section was simulated by the current source, but it is applicable when the input mean current becomes a direct current and also applicable to the current control system of the synchronous motor shown in FIG. 18 as well as to the vector control of an induction motor. It may be a DC chopper.

Figure 16A:
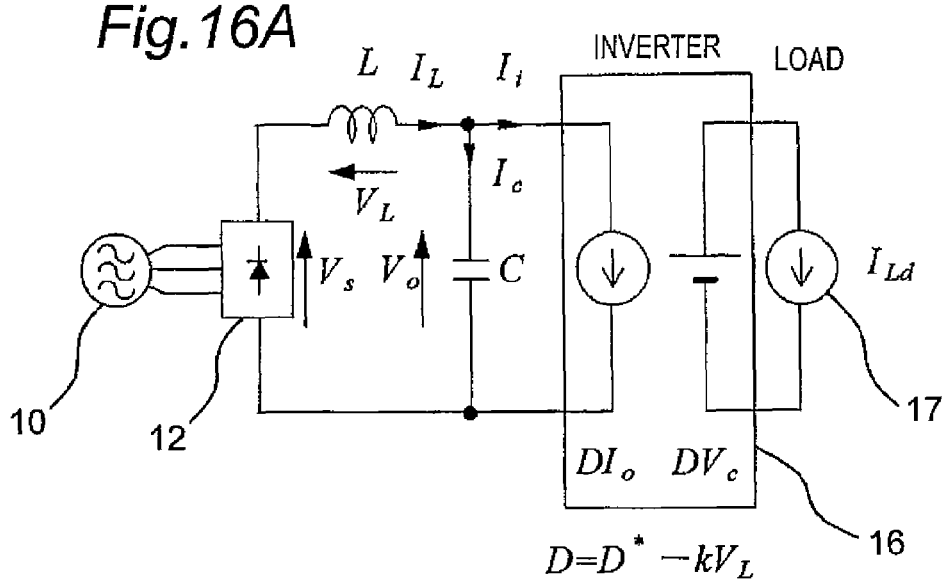
FIG. 16A is a diagram for explaining the transfer characteristic of the inverter used for resonance suppression by the voltage control ratio of the invention.

Next, FIG. 16A shows a block diagram for explaining the transfer characteristic of an inverter in which the voltage control ratio of the invention is used for resonance control. In FIG. 16A, reference numeral 16 denotes an inverter section that has a current source on the input side and a dc power source on the output side, and reference numeral 17 denotes a current source (load) connected to the dc power source of the inverter section 16. In this case, it is assumed that a load current is $I_{Ld}$, and the voltage control ratio of the inverter section 16 is D.

Figure 16B:
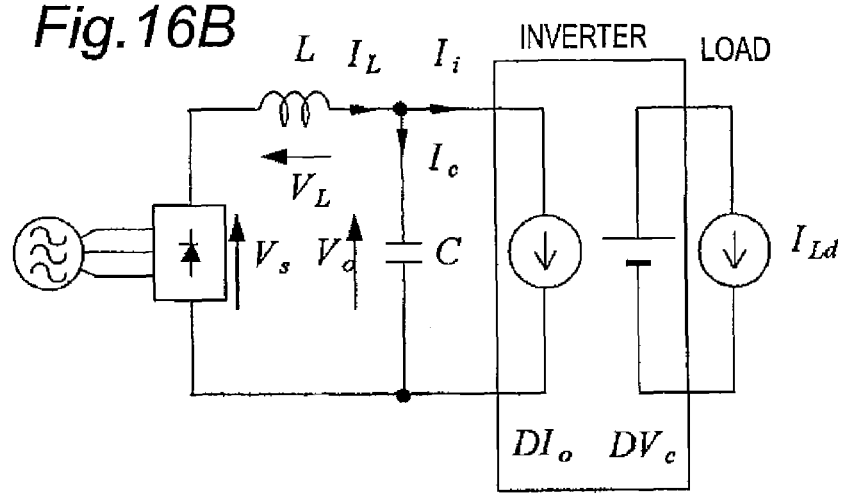
FIG. 16B is a diagram for explaining the transfer characteristic of the inverter used for resonance suppression by the voltage control ratio of the invention.

In the vibration suppression system by the voltage control ratio shown in FIG. 16A, assuming that a voltage control ratio initial value D*=1, then, as shown in FIG. 16B, the current source on the input side of the inverter section comes to have the relations represented by:

$$D=1-kV_L$$

$$DI_{Ld}=I_{Ld}-I_{Ld}kV_L$$

Figure 16C:
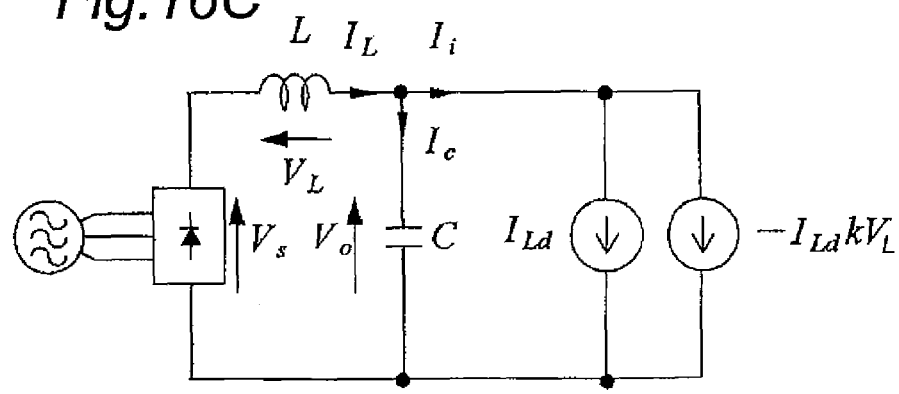
FIG. 16C is a diagram for explaining the transfer characteristic of the inverter used for resonance suppression by the voltage control ratio of the invention.

Therefore, the circuit shown in FIG. 16B can be replaced by the equivalent circuit shown in FIG. 16C.

Figure 10A:
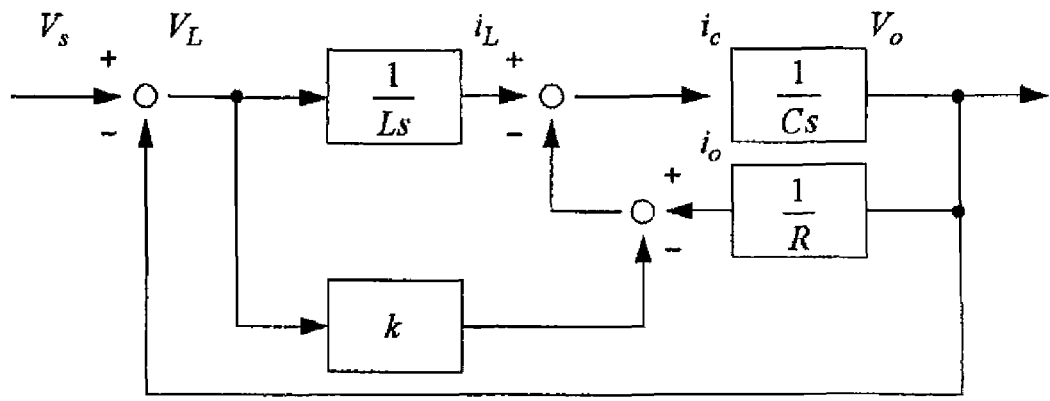
FIG. 10A is a block diagram of the inverter.
Figure 10B:
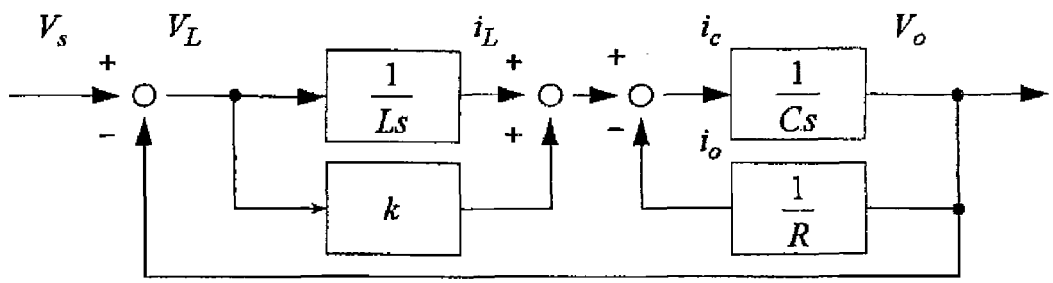
FIG. 10B is a block diagram of the inverter.
Figure 10C:
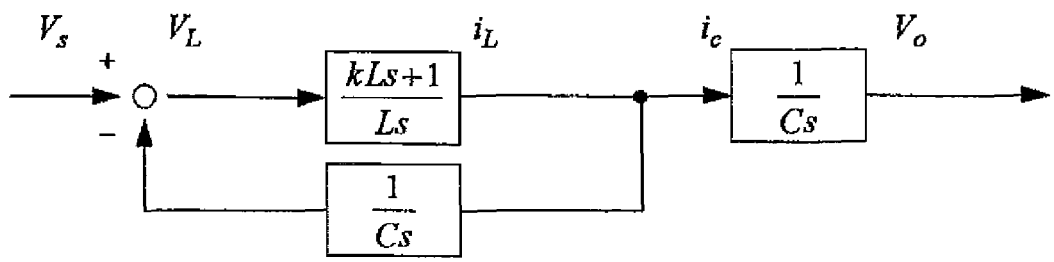
FIG. 10C is a block diagram of the inverter.
Figure 10D:
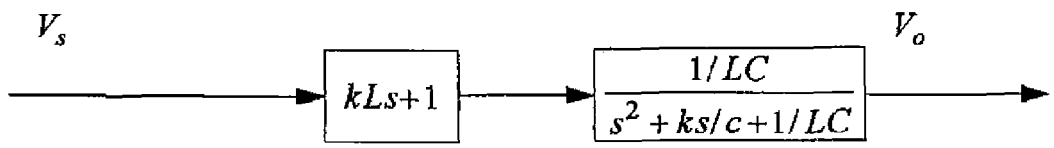
FIG. 10D is a block diagram of the inverter.
Figure 17:
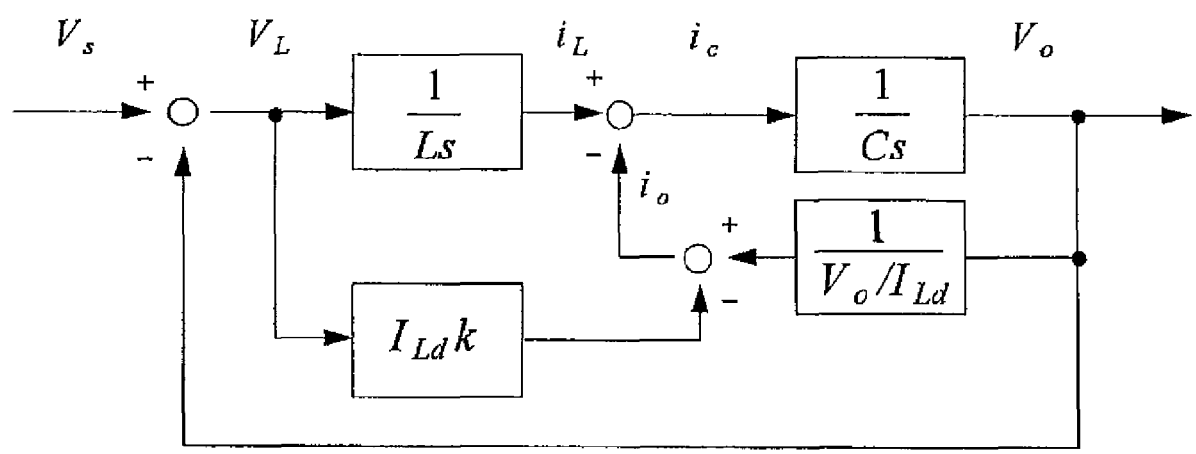
FIG. 17 is a block diagram of the inverter.

Therefore, FIG. 16C is expressed by the block diagram shown in FIG. 17, and assuming that the current source on the secondary side of the inverter section is constant, it can be understood that a constant corresponding to the resistance R and control gain k in the construction of the block diagram shown in FIG. 10A is given. Therefore, it can be understood that the system, in which the suppression value is added to the voltage control ratio of the inverter shown in FIG. 16A through FIG. 16C and FIG. 17, comes to have a transfer function corresponding to the transfer function shown in FIG. 11 although the method for adding the suppression value to the current control system as well as control gain differ from those of the inverter shown in FIG. 9 and FIGS. 10A through 10D.

The block diagram shown in FIG. 17 is expressed simply by the voltage source and LCR on the assumption that the current control system is controlled at high speed, thus FIG. 17 becomes similar to FIG. 10 A.

With regard to the current control of the inverter shown in FIG. 9 and FIGS. 10A through 10D, damping suppression of the LC filter is performed by controlling the effective current component of the AC load by using a q-axis control system and varying the DC current. In contrast to this, with regard to the voltage control ratio of the inverter shown in FIGS. 16A through 16C and FIG. 17, a relation of a voltage (current) between the AC load and the DC load is controlled. By thus varying the voltage control ratio, the DC power can be similarly varied.

Therefore, response delay occurs due to restrictions in frequency band of the current control system of the inverter shown in FIG. 9 and FIGS. 10A through 10D. However, the inverter shown in FIGS. 16A through 16C and FIG. 17 uses the voltage control ratio for suppressing resonance and can directly control the relation between the AC load current and the DC load current, and thus is high speed.

According to the inverter of the invention that has the LC filter in the DC link part can suppress the vibration as well as distortion of the input current.

Moreover, the attenuation coefficient is increased by providing the voltage detecting section that detects the cross terminal voltage of the inductance element of the LC filter and controlling the input current of the inverter section by the control section on the basis of the cross terminal voltage of the inductance element detected by the voltage detecting section, and stability can be improved by making the control system have a characteristic close to the first-order lag system by the gain setting corresponding to the constant of the reactance element of the LC filter.

Otherwise, the attenuation coefficient is increased by providing the voltage detecting section that detects the cross terminal voltage of the inductance element of the LC filter and controlling the voltage control ratio of the inverter section by the control section on the basis of the cross terminal voltage of the inductance element detected by the voltage detecting section, and stability can be improved by making the control system have a characteristic close to the first-order lag system by the gain setting corresponding to the constant of the reactance element of the LC filter. In addition, since the relation between the AC load current and the DC load current can be directly controlled by the voltage control ratio, a high-speed response can be achieved, and more stable operation becomes possible.

Moreover, by applying the invention to the inverter in which the inverter section is vector-controlled by the control section, speed control can easily be performed with stable operation.

Next, the inverter of the invention is described in detail by the embodiments shown in the drawings.

First Embodiment

FIG. 18 shows a block diagram of the inverter of the first embodiment of the invention.

As shown in FIG. 18, the inverter has a diode bridge 21 constructed of six diodes D11 through D16 that constitute a three-phase diode bridge circuit, an inverter section 22 constructed of six switching elements S11 through S16 that constitute a three-phase bridge circuit, and a control section 100 that controls the inverter section 22. Moreover, the inverter has an inductor $L_{dc}$ as one example of the inductance element connected between the positive pole side output terminal of the diode bridge 21 and the positive pole side input terminal of the inverter section 22, a capacitor $C_{dc}$ as one example of the capacitance element connected across the input terminals of the inverter section 22, and a voltage detecting section 24 that detects the cross terminal voltage $V_L$ Of the inductor $L_{dc}$. The inductor $L_{dc}$ and the capacitor $C_{dc}$ constitute an LC filter. A three-phase AC voltage from a three-phase AC power source (not shown) is rectified into a direct current by the diode bridge 21, and the rectified DC voltage is converted into the desired three-phase AC voltage by the inverter section 22 and outputted to a motor 23.

Moreover, the control section 100 of the inverter has:

an adder-subtractor 101 that subtracts a rotational angular velocity $\omega_{re}$ from a rotational angular velocity set point $\omega_{re}^*$ and outputs a difference signal;

a PI controller 102 that performs PI control of the difference signal from the adder-subtractor 101;

a multiplier 103 that multiplies the cross terminal voltage $V_L$ of the inductor $L_{dc}$ detected by the voltage detector 24 by the gain k;

an adder-subtractor 104 that subtracts a signal from the multiplier 103 from a signal from the PI controller 102 and outputs a current set point $I_a^*$;

a conversion section 105 that multiplies the current set point $I_a^*$ from the adder-subtractor 104 by $-\sin\beta^*$ ($\beta^*$: current phase set point) and outputs a d-axis current set point $I_d^*$;

an adder-subtractor 106 that subtracts a d-axis current value $I_d$ from the d-axis current set point $I_d^*$ from the conversion section 105;

a conversion section 107 that multiplies the current set point $I_a^*$ from the adder-subtractor 104 by $\cos\beta^*$ ($\beta^*$: current phase set point) and outputs a q-axis current set point $I_q^*$;

an adder-subtractor 108 that subtracts a q-axis current value $I_q$ from the q-axis current set point $I_q^*$ from the conversion section 107;

a PI controller 109 that performs PI control of a signal from the adder-subtractor 106;

a multiplying section 110 that multiplies the d-axis current value $I_d$ by $\omega_{re}L_d$ ($L_d$: d-axis inductance);

a multiplying section 111 that multiplies the q-axis current value $I_q$ by $\omega_{re}L_q$ ($L_q$: q-axis inductance);

a PI controller 112 that performs PI control of a signal from the adder-subtractor 108;

an adder-subtractor 113 that subtracts a signal from the multiplying section 111 from a signal from the PI controller 109 and outputs a d-axis voltage $V_{id}$;

an adder-subtractor 114 that adds a signal from the multiplying section 110 to a signal from the PI controller 112;

a multiplier 115 that multiplies the rotational angular velocity $\omega_{re}$ by an induction voltage coefficient ke;

an adder-subtractor 116 that adds a signal from the multiplier 115 to a signal from the adder-subtractor 114 and outputs a q-axis voltage $V_{iq}$; and a PWM modulating section 117 that outputs a PWM control signal to the inverter section 22 on the basis of the d-axis voltage $V_{id}$ from the adder-subtractor 113 and the q-axis voltage $V_{iq}$ from the adder-subtractor 116.

The inverter of the above construction is a system in which a suppression value is added to the current control system and damping suppression of the LC filter is performed by controlling the effective current component of the AC load and varying the DC current.

Second Embodiment

Figure 19:
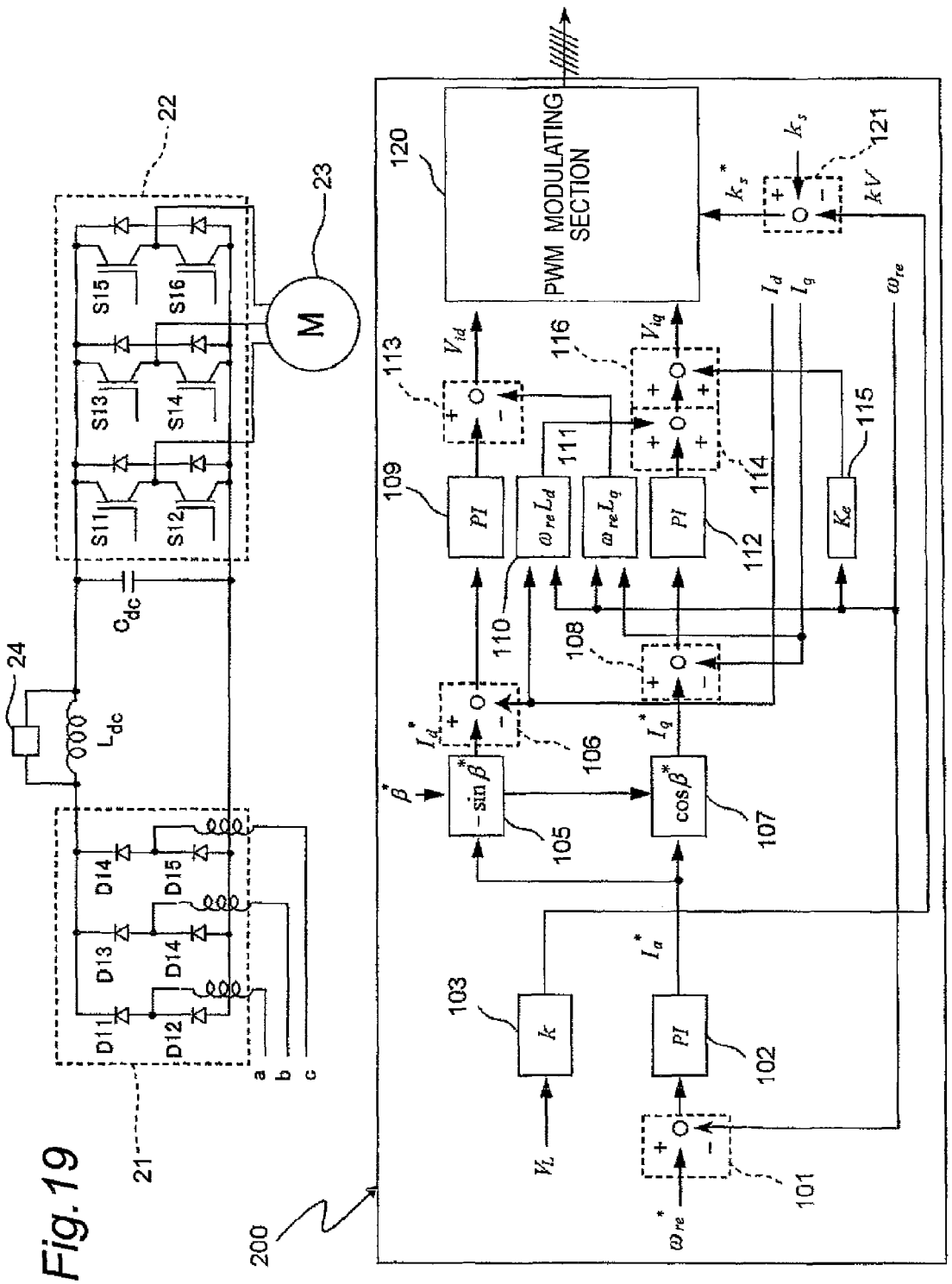
FIG. 19 is a block diagram of the inverter of the second embodiment of the invention.

FIG. 19 shows a block diagram of the inverter of the second embodiment of the invention. The inverter has a construction identical to that of the inverter of the first embodiment except for the control section.

The control section 200 of the inverter has:

an adder-subtractor 101 that subtracts the rotational angular velocity $\omega_{re}$ from the rotational angular velocity set point $\omega_{re}^*$ and outputs a difference signal;

a PI controller 102 that performs PI control of a difference signal from the adder-subtractor 101;

a multiplier 103 that multiplies the cross terminal voltage $V_L$ of the inductor $L_{dc}$ detected by the voltage detector 24 by the gain k;

a conversion section 105 that multiplies the current set point $I_a^*$ from the PI controller 102 by $-\sin\beta^*$ ($\beta^*$: current phase set point) and outputs a d-axis current set point $I_d^*$;

an adder-subtractor 106 that subtracts the d-axis current value $I_d$ from the d-axis current set point $I_d^*$ from the conversion section 105;

a conversion section 107 that multiplies the current set point $I_a^*$ from the PI controller 102 by $\cos\beta^*$ ($\beta^*$: current phase set point) and outputs a q-axis current set point $I_q^*$;

an adder-subtractor 108 that subtracts the q-axis current value $I_q$ from the q-axis current set point $I_q^*$ from the conversion section 107;

a PI controller 109 that performs PI control of a signal from the adder-subtractor 106;

a multiplying section 110 that multiplies the d-axis current value $I_d$ by $\omega_{re}L_d$ ($L_d$: d-axis inductance);

a multiplying section 111 that multiplies the q-axis current value $I_q$ by $\omega_{re}L_q$ ($L_q$: q-axis inductance);

a PI controller 112 that performs PI control of a signal from the adder-subtractor 108;

an adder-subtractor 113 that subtracts a signal from the multiplying section 111 from a signal from the PI controller 109 and outputs a d-axis voltage $V_{id}$;

an adder-subtractor 114 that adds a signal from the multiplying section 110 to a signal from the PI controller 112;

a multiplier 115 that multiplies the rotational angular velocity $\omega_{re}$ by an induction voltage coefficient ke;

an adder-subtractor 116 that adds a signal from the multiplier 115 to a signal from the adder-subtractor 114 and outputs a q-axis voltage $V_{iq}$;

an adder-subtractor 121 that subtracts a signal (kV) from the multiplier 103 from an initial value $k_s$ of the voltage control ratio and outputs a voltage control ratio set point $k_s^*$; and a PWM modulating section 120 that outputs a PWM control signal to the inverter section 22 on the basis of the d-axis voltage $V_{id}$ from the adder-subtractor 113, the q-axis voltage $V_{iq}$ from the adder-subtractor 116 and the voltage control ratio set point $k_s^*$ from the adder-subtractor 121.

The inverter of the above construction is a system in which a suppression value is added to the voltage control ratio and damping suppression of the LC filter is performed by varying the voltage control ratio and similarly varying the DC power.

By detecting the cross terminal voltage of the inductance element of the LC filter in the inverter that has the LC filter in the DC link part of the first and second embodiments, resonance suppression control is enabled without containing the power pulsation component and the power source fundamental wave component, and reliability improvement (preventing overcurrent and overvoltage) by stabilizing the control system and the current waveform can be improved.

Moreover, although the inverter of the vector control of the DC motor has been described in the first and second embodiments, an inverter that employs an AC motor as a load is acceptable. Moreover, the inverter of the invention may not have a motor on the load side, and the load is only required to feed an effective power.

The invention claimed is:

1. An inverter comprising:
a diode bridge (11, 21) that rectifies an inputted three-phase AC voltage into a DC voltage;
an inverter section (12, 22) that converts the DC voltage converted by the diode bridge (11, 21) into an AC voltage and outputs the resulting voltage;
an LC filter having an inductance element (L, $L_{dc}$) connected between one output terminal of the diode bridge (11, 21) and one input terminal of the inverter section (12, 22) and a capacitance element (C, $C_{dc}$) connected across input terminals of the inverter section (12, 22);

a voltage detecting section (24) that detects a cross terminal voltage of the inductance element ($L_{dc}$) of the LC filter; and a control section (100, 200) that controls the inverter section (12, 22) so that a transfer characteristic of an I/O voltage of the inverter section (12, 22) becomes a characteristic close to a first-order lag system on the basis of the cross terminal voltage of the inductance element detected by the voltage detecting section (24).

2. The inverter as claimed in claim 1, wherein the control section (100) controls an input current of the inverter section (22) so that the transfer characteristic of the I/O voltage of the inverter section (22) becomes a characteristic close to the first-order lag system on the basis of the cross terminal voltage of the inductance element detected by the voltage detecting section (24).

3. The inverter as claimed in claim 1, wherein the control section (200) controls a voltage control ratio of the inverter section (22) so that the transfer characteristic of the I/O voltage of the inverter section (22) becomes a characteristic close to the first-order lag system on the basis of the cross terminal voltage of the inductance element detected by the voltage detecting section (24).

4. The inverter as claimed in claim 1, wherein the inverter section (12, 22) is vector-controlled by the control section (100, 200).

* * * * *